US006845893B2

(12) United States Patent
Nelson

(10) Patent No.: US 6,845,893 B2
(45) Date of Patent: Jan. 25, 2005

(54) MOUNTING FOOT ASSEMBLY FOR LIGHTBAR

(75) Inventor: Jeff Nelson, Haddam, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 151 days.

(21) Appl. No.: 10/373,440

(22) Filed: Feb. 25, 2003

(65) Prior Publication Data

US 2004/0164111 A1 Aug. 26, 2004

(51) Int. Cl.$^7$ .............................................. B60R 9/052
(52) U.S. Cl. ....................... 224/322; 224/326; 224/329; 362/542
(58) Field of Search ................................ 224/321, 322, 224/323, 324, 325, 326, 327, 329, 330, 331; 340/472, 473; 362/493, 542

(56) References Cited

U.S. PATENT DOCUMENTS

| 3,677,451 | A | * | 7/1972 | Burland | 224/322 |
| 4,120,435 | A | * | 10/1978 | Eby | 224/322 |
| 4,588,118 | A | * | 5/1986 | Ferenc et al. | 224/331 |
| 5,027,260 | A | * | 6/1991 | Lyons et al. | 362/542 |
| 5,257,710 | A | * | 11/1993 | Cropley | 224/331 |
| 5,931,359 | A | * | 8/1999 | Zona | 224/321 |
| 6,050,466 | A | * | 4/2000 | Cronce et al. | 224/321 |
| 6,722,776 | B1 | * | 4/2004 | Lyons et al. | 362/493 |

* cited by examiner

*Primary Examiner*—Stephen K. Cronin
(74) *Attorney, Agent, or Firm*—Alix, Yale & Ristas, LLP

(57) ABSTRACT

The generally rectangular support platform of a mounting foot primary component includes laterally extending tabs configured for reception in respective of longitudinally extending slots defined by an elongated strength member of the light bar. Diagonally opposite corners of the support platform are rounded off so that the primary component is installable by insertion toward the elongated member at an angular orientation and rotation to engage the tabs in the slots. The support platform defines a recessed channel for carrying a metal retaining bar. Fasteners passing through threaded openings in the retaining bar force the retaining bar and primary component away from the elongated member, placing the support platform tabs and lateral ends of the retaining bar in frictional engagement with the lips of the elongated member. A blocking bar is fixed against an end face of the primary component to block counter rotation of the mounting foot relative to the elongated member.

11 Claims, 7 Drawing Sheets

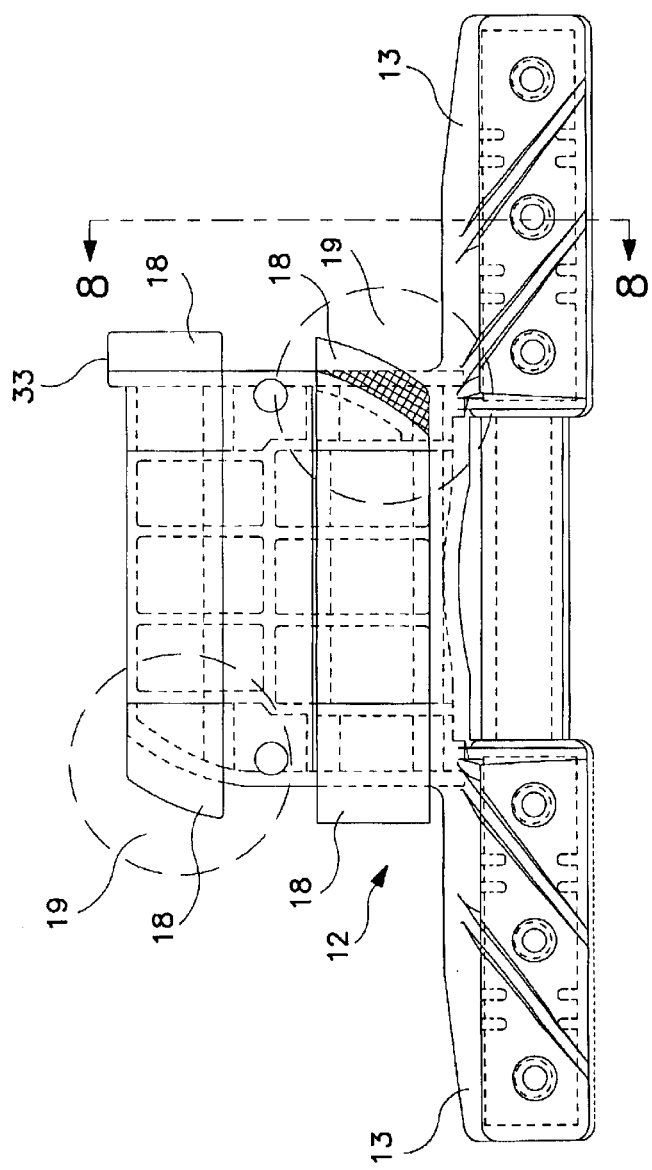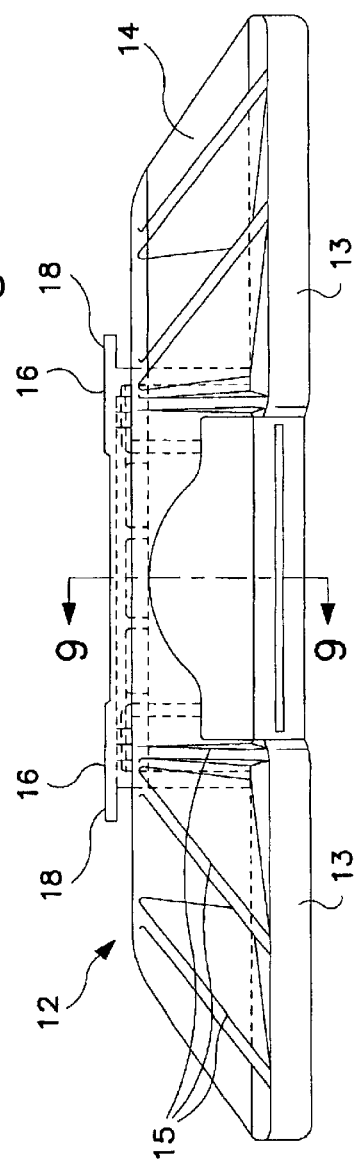

MOUNTING FOOT ASSEMBLY FOR LIGHTBAR

BACKGROUND OF THE INVENTION

1. Field of the Invention

The present invention generally relates to mounting hardware for securing warning light arrays to motor vehicles and more particularly to a mounting foot assembly for securing a lightbar to the roof of a motor vehicle.

2. Description of the Related Art

Lighting systems for mounting on the exterior of police and other public service vehicles have long been known in the art. Exterior mounting of such lighting systems is generally preferred in order to enhance the visibility thereof, i.e., a warning light mounted above the roof of an emergency vehicle may be more readily seen than a light mounted below the vehicle roof line or within the vehicle. Such exterior mounting also affords the possibility of the emitted light being seen from any direction and minimizes the possibility that the light produced by the lighting system will interfere with the vision of the vehicle operator.

A long-standing problem associated with lightbar assemblies resides in mounting the assembly to the vehicle in such a manner that it may be easily positioned as desired on the vehicle and, most importantly, will not become loose due to vibration or other causes and either change position or become dislodged. There are, of course, many mounting assemblies known in the prior art for attaching devices to the roof of a motor vehicle. U.S. Pat. No. 4,588,118 (hereinafter the '118 patent), assigned to the assignee of the present invention, discloses a mounting foot assembly for securing a lightbar to the exterior of a motor vehicle. Specifically, the mounting foot assembly includes a mounting member foot portion and gutter clamp which support the mounting member in clamped relationship to a rain gutter of the motor vehicle. An upwardly projecting portion of the mounting member has laterally projecting tabs for engagement with inwardly facing longitudinal slots defined by an I-beam extruded aluminum strength member. The mounting foot assembly includes locking cams configured to extend outwardly to engage the bottom of the longitudinal slots. When secured in their engaged position, the locking cams secure respective of the mounting members to the I-beam and urge the corresponding gutter clamp inwardly to secure the mounting foot assembly to the gutters at the opposite sides of the vehicle.

While the lightbar mounting foot assembly disclosed in the '118 patent has been commercially successful and provided a secure engagement between the lightbar and the motor vehicle, further improvements in lightbar mounting are possible. For example, modern motor vehicle design has eliminated the outwardly projecting rain gutter and thus a convenient clamping location. Further, reinforced plastic materials may be used to form a mounting foot having improved efficiency of manufacture and aesthetic appearance. These changes result in the need for a new and effective mounting foot assembly that is compatible with modern vehicle configurations and mounting foot materials.

The lightbar disclosed in the '118 patent, as well as that disclosed in U.S. Pat. No. 5,027,260 (hereinafter the '260 patent), also assigned to the assignee of the present invention, are constructed around a longitudinally extending extruded aluminum strength member. This strength member may be in the form of an I-beam as shown in the '118 patent, a concave channel as shown in the '260 patent, or the like.

Extrusion is an efficient method for obtaining a strength member of high rigidity having a complex sectional configuration. Longitudinally extending features are arranged for the mounting of lightheads, internal components such as power supplies to the interior of the extrusion and exterior components such as lenses to the exterior of the extrusion.

Typically, components are engaged with longitudinal features defined by the extrusion and slid along the length of the extrusion into a desired position where they are secured in place by set screws bearing against the extrusion. Brackets or mounting feet for a lightbar have been fixed to the bottom exterior surface of the lightbar strength member in a similar manner. Lightbars are typically assembled according to a customer's specification and shipped to the customer for installation on a motor vehicle. In a fully assembled lightbar, end caps may cover entry openings for all of the longitudinally extending features, including the inwardly facing slots configured to receive the upper portions of mounting brackets or mounting feet. In such a lightbar, the feet must be mounted to the lightbar prior to installation of the end caps or the lightbar must be partially disassembled by the end user to accommodate mounting of the support foot or mounting bracket. Shipping a lightbar with the mounting feet attached increases the cost of shipping and also increases the likelihood of breakage during shipment. End user disassembly and re-assembly of lightbar components to the extrusion complicates lightbar installation. Disassembly also presents the possibility of leakage and premature failure of lightbar components.

There is a need in the art for a mounting foot for a lightbar which is compatible with an extruded lightbar strength member and which does not require disassembly of the lightbar for mounting the foot to the lightbar strength member. Preferably, a mounting foot will have features that lock the foot to the strength member to prevent loosening during use.

BRIEF DESCRIPTION OF THE DRAWINGS

FIG. 5 is a top plan view, partly in phantom, of a primary component of the mounting foot assembly of FIG. 3;

FIG. 6 is an end plan view, partly in phantom, of the primary component shown in FIG. 5 viewed from the lower edge of FIG. 5;

DETAILED DESCRIPTION OF THE PREFERRED EMBODIMENTS

Figure 1:
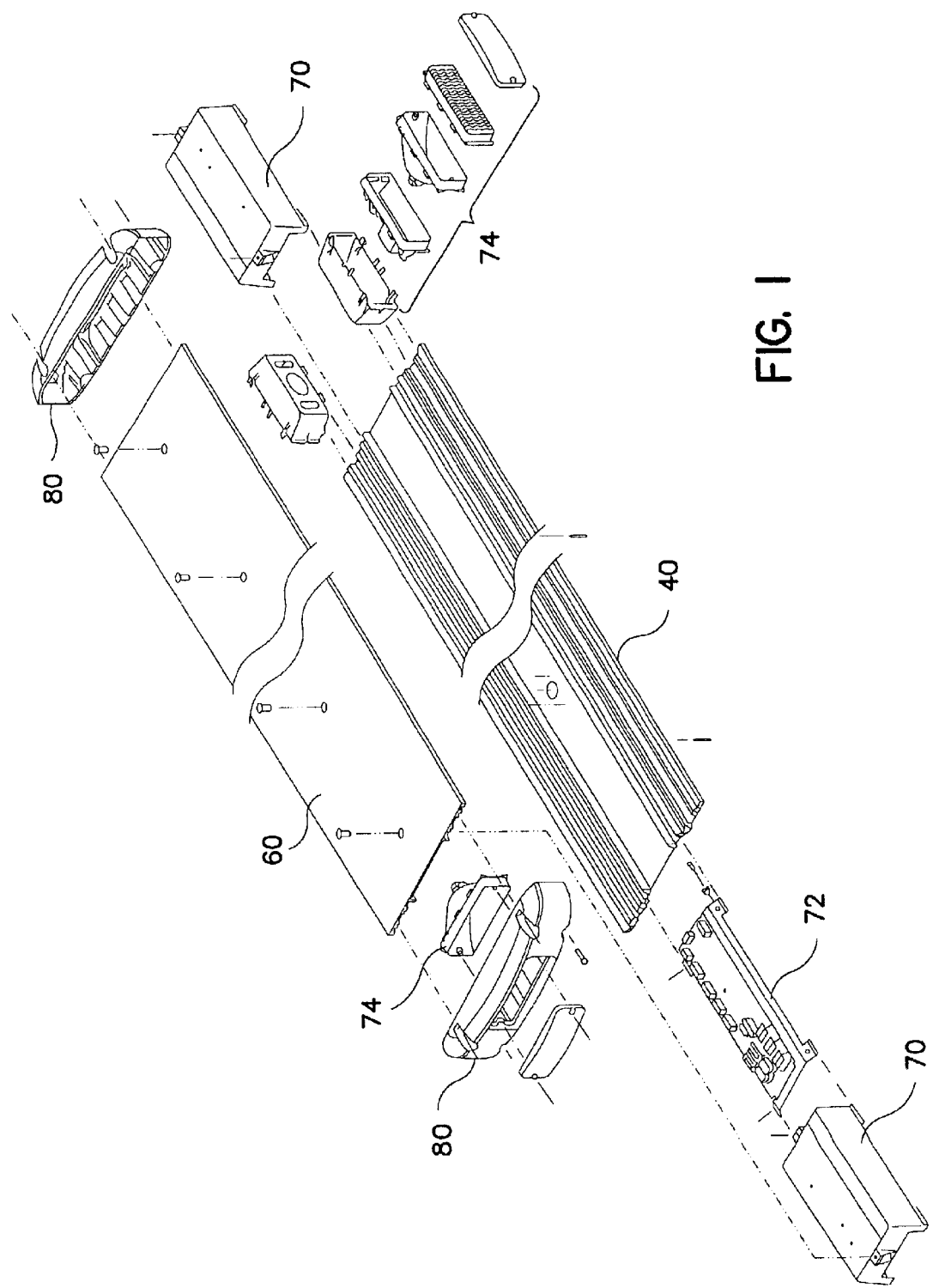
FIG. 1 is an exploded perspective view of a representative lightbar that may be secured to a motor vehicle using a mounting foot in accordance with the present invention.
Figure 2:
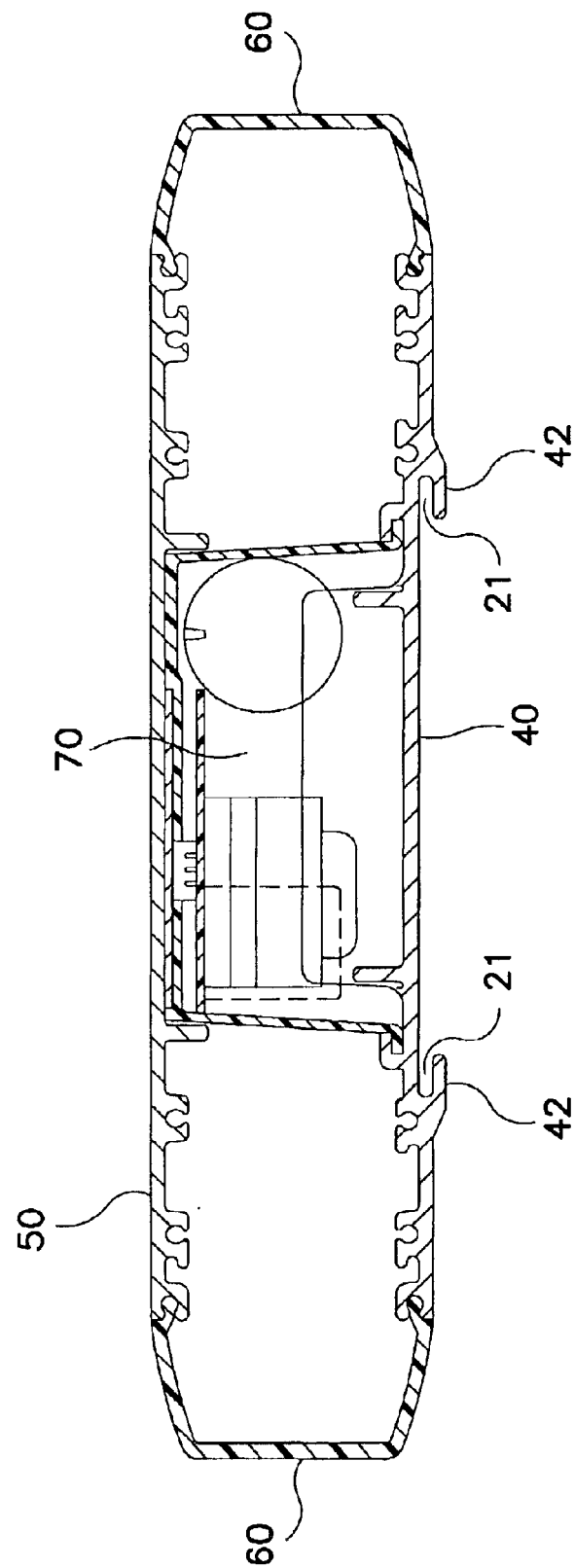
FIG. 2 is a sectional view through an assembled lightbar similar to that shown in FIG. 1.
Figure 3:
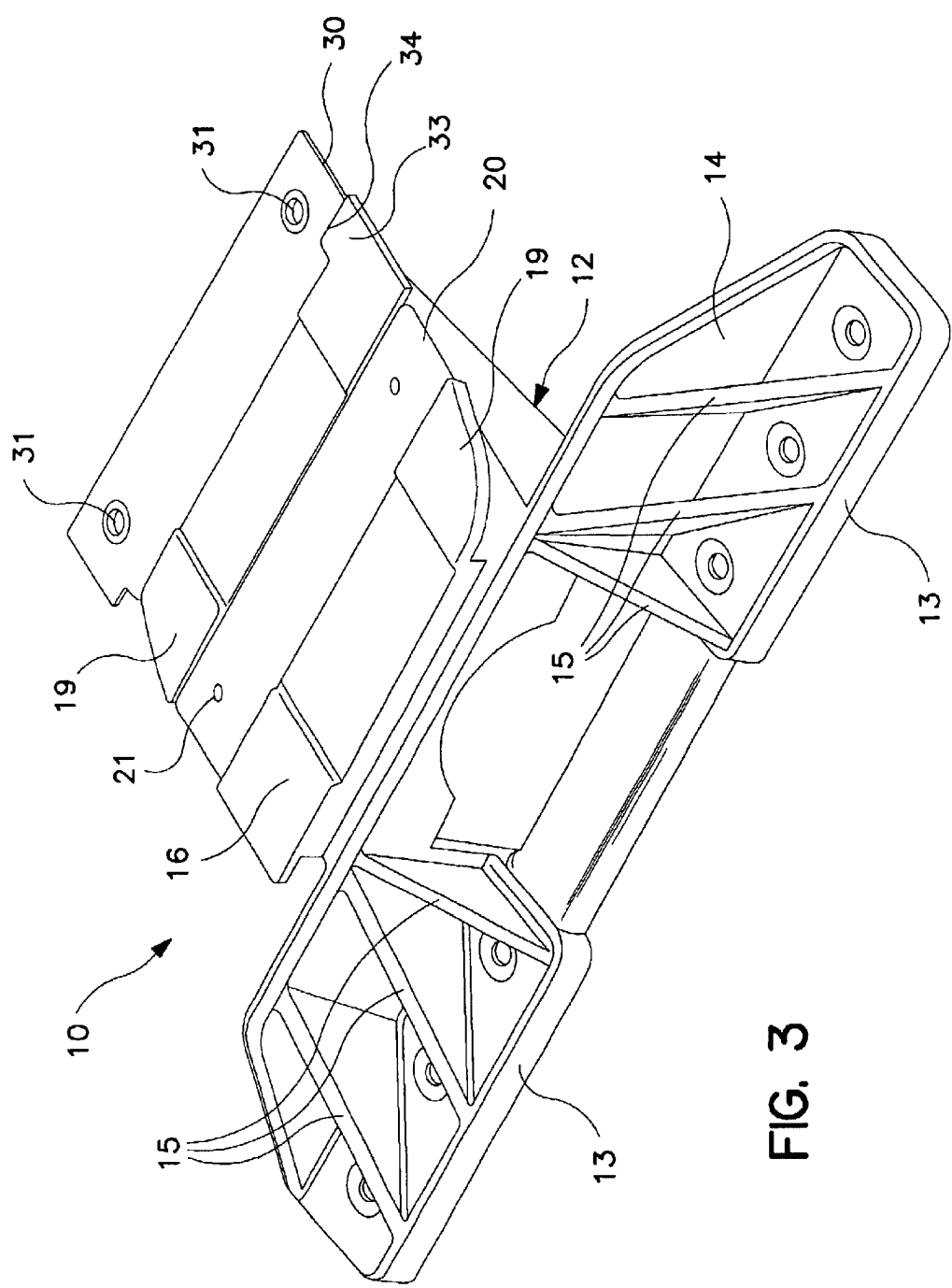
FIG. 3 is an exterior perspective view of a representative mounting foot assembly in accordance with several aspects of the present invention.
Figure 4:
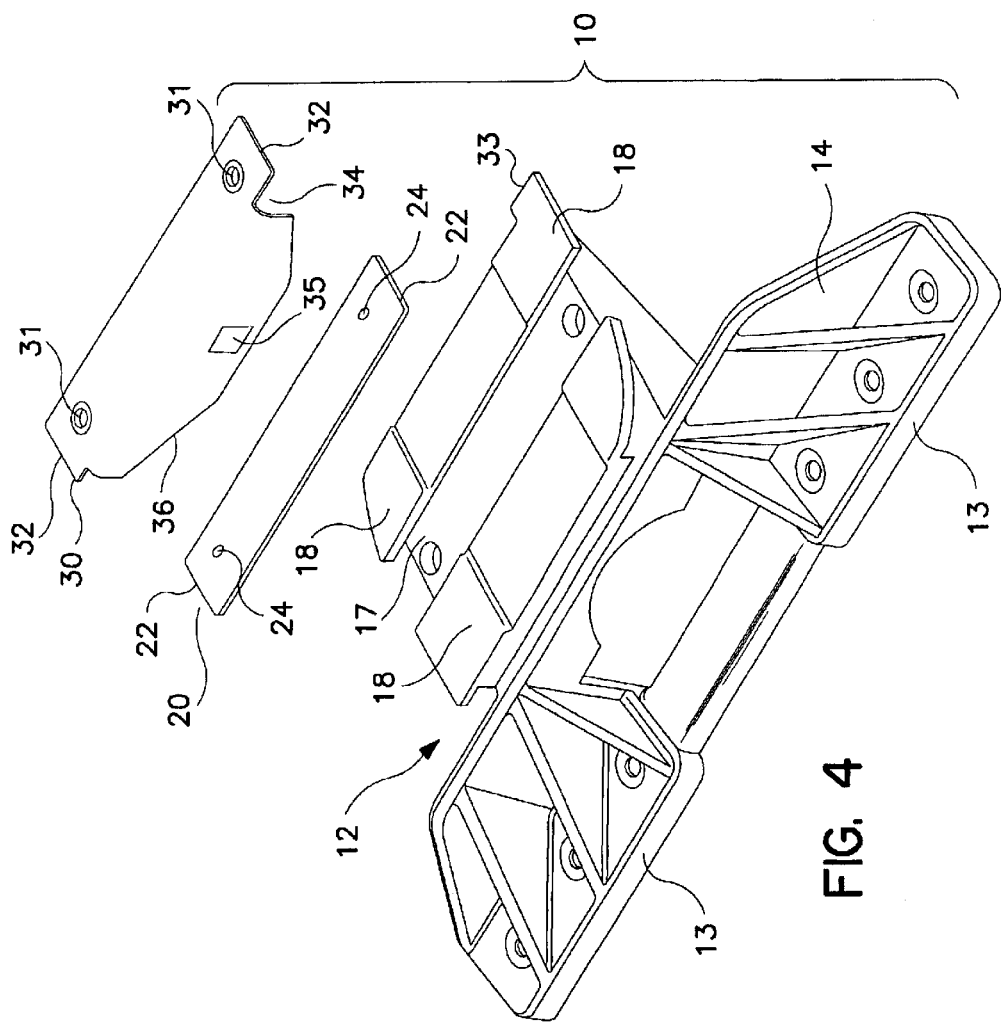
FIG. 4 is an exploded view of the mounting foot assembly of FIG. 3.
Figure 7:
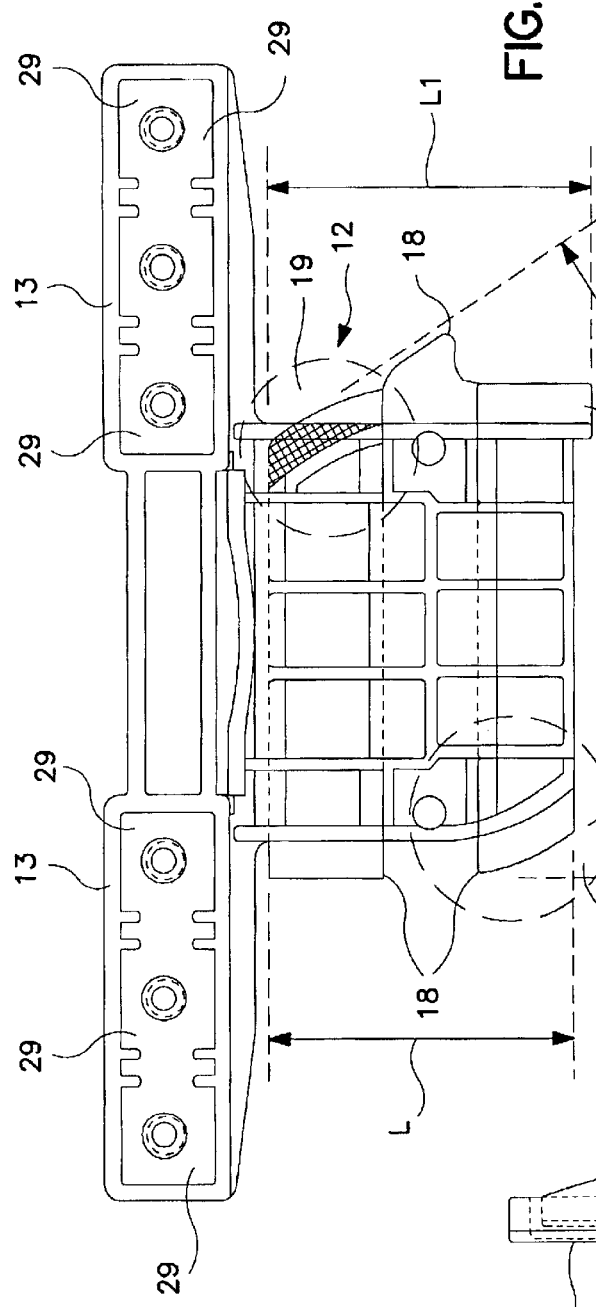
FIG. 7 is a bottom plan view, partly in phantom, of a primary component of the mounting foot assembly of FIG. 3.

FIGS. 1 and 2 illustrate a lightbar in which the components are mounted to upper and lower extruded members 60, 40. Each of the extruded members 60, 40 defines longitudinally extending features that provide locations for securing various internal and external components of the lightbar. Power supplies 70, an I/O board 72 and various light assemblies 74 are slidably received in the longitudinally extending features and are fixed in place by screws engaging the extruded member. End caps 80 support a light unit 74 and enclose the longitudinal ends of the assembled lightbar. FIG. 2 is an end sectional view through the assembled lightbar with light units omitted for clarity. Installation of the end caps 80 covers the ends of the mounting foot slots 21 at either longitudinal end of the lower extruded member 40.

FIGS. 3–9 illustrate an exemplary mounting foot assembly 10 for a lightbar illustrative of several aspects of the present invention. The primary component 12 of the mounting foot assembly is a unitary member preferably molded from fiber reinforced plastic. The primary component 12 includes a base 13 for mounting to the roof of a motor vehicle. The base 13 defines fastener openings through which fasteners engage, for example, the roof of a motor vehicle. Strengthening webs 15 connect the base to an upwardly extending wall 14 of the primary component.

Figure 9:
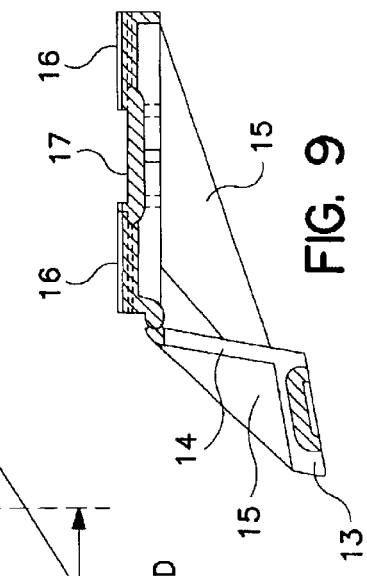
FIG. 9 is a sectional view, partly in phantom, through the primary component shown in FIG. 6, taken along line 9—9 thereof.
Figure 8:
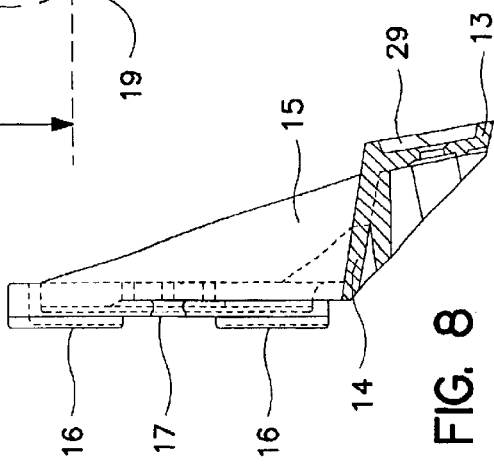
FIG. 8 is a sectional view, partly in phantom, through a portion of the primary component shown in FIG. 5, taken along line 8—8 thereof.

Centered over the base 13 and integrally supported by the upwardly extending wall 14 is a generally horizontal support platform 16 with generally vertical reinforcing ribs. As shown in FIGS. 8 and 9, the base 13 is not parallel to the support platform 16 when the primary component 12 is viewed in section. This configuration accommodates the curvature of the vehicle roof. Tabs 18 project laterally from the support platform 16 and are configured for engagement in the longitudinally extending mounting foot slots 21 defined by the lower extrusion 40 of the lightbar (best seen in FIG. 2). The support platform dimension L, L1 is extended so that each lateral side of the support platform 16 includes two tabs 18 separated by a recessed channel 17. A retaining bar 20 is received in the channel 17. The retaining bar 20 is a simple strip of heavy-gauge metal, preferably stainless steel, which is received in the channel 17 defined by the support platform. The retaining bar 20 is configured to traverse the width W of the support platform 16 and be received in respective of the mounting foot slots 21. With the retaining bar 20 installed, each lateral side of support platform 16 engages a mounting foot slot 21 with two tabs 18 and one lateral end 22 of the retaining bar. The extended platform dimension L, L1 provides stability to the mounting foot/light bar interface, while the steel retaining bar 20 provides high strength to the engagement.

The support platform 16 is generally rectangular in configuration (W by L, L1) and has a width W measured at the lateral extremity of the tabs 18. Diagonally opposite corners 19 of the support platform are rounded, with the curvature of the rounding defined by a circle of diameter D equal to the width W of the support platform. The tab 18 and the adjacent reinforcing ribs at the diagonally opposite corners 19 of the support platform 16 are rounded off. The rounded configuration of these diagonally opposite corners 19 allows the support platform tabs 18 to be received between the longitudinally extending lips 42 of the lower extrusion 40 when the primary component 12 is positioned at an angle of approximately 70° to 90° relative to its installed position in the extrusion 40. Once the support platform 16 is received against the lower extrusion 40 at this angular orientation, it is then rotated such that the base 13 is perpendicular to the longitudinal extent of the lightbar. This clockwise rotation of the primary component 12 fully engages the tabs 18 and the lateral ends 22 of the retaining bar in respective of the mounting foot slots 21.

When the primary component 12 is in its installed position relative to the extrusion 40, set screws 26 (see FIG. 10) pass through openings in the primary component to threadably engage threaded bores 24 in the retaining bar 20. The set screws 26 extend through the threaded bores 24 to engage the lower surface of the lightbar extrusion 40. The set screws 26 push the retaining bar 20 away from the lower surface of the extrusion 40 to engage the lateral ends 22 of the retaining bar 20 and the support platform tabs 18 against the extruded lips 42 of the mounting foot slots 21. Thus, the primary component 12 is securely frictionally engaged with the lightbar extrusion 40.

The novel configuration of the support platform 16 permits the primary component 12 to be secured to the lightbar extrusion 40 without any disassembly or modification to an assembled lightbar. The received retaining bar 20 significantly enhances the security of the mounted relationship due to the strength and rigidity of the retaining bar.

Engagement of the primary component 12 to the lightbar is supplemented by a blocking bar 30 that prevents the primary component 12 from rotating counter clockwise in a manner that would permit the lightbar to disengage from the primary component 12. An exemplary blocking bar 30 is a laterally extending bent metal (angle) bracket configured to be installed against the inward end face of the support platform 16 to block counter clockwise rotation of the primary component 12 relative to the extrusion 40. The inward end face of the support platform 16 includes a projection 33 arranged to fit in a notch 34 defined by the blocking bar 30. During installation, the primary component 12 is positioned and secured in place using the retaining bar 20. Lateral ends 32 of the blocking bar 30 are then engaged in the respective mounting foot slots 21 and the blocking element 30 is slidably moved into place against the inward end of the support platform 16. The downwardly extending portion 36 of the blocking bar 30 is laterally inwardly offset to define a notch 34 complementary to the projection 33 extending from one corner of the support platform 16. It will be noted that the primary component 12 and the complementary blocking bar 30 may be installed on either end of a lightbar extrusion 40. Therefore, while the support platform 16 is asymmetrical, the blocking bar 30 is configured for use against the inward end of a support platform 16 installed at either lateral end of a lightbar. The blocking bar 30 defines threaded bores 31 for reception of set screws 26. Set screws 26 threadably engage the bores 31 of the blocking bar 30 and bear against the extrusion 40 to set up a frictional engagement between the blocking bar 30 and the extrusion 40 quite similar to that established between the retaining bar 20 and the extrusion 40. The downwardly extending portion 36 of the blocking bar 30 defines a square opening 35 for a self-retained nut 48.

Figure 10:
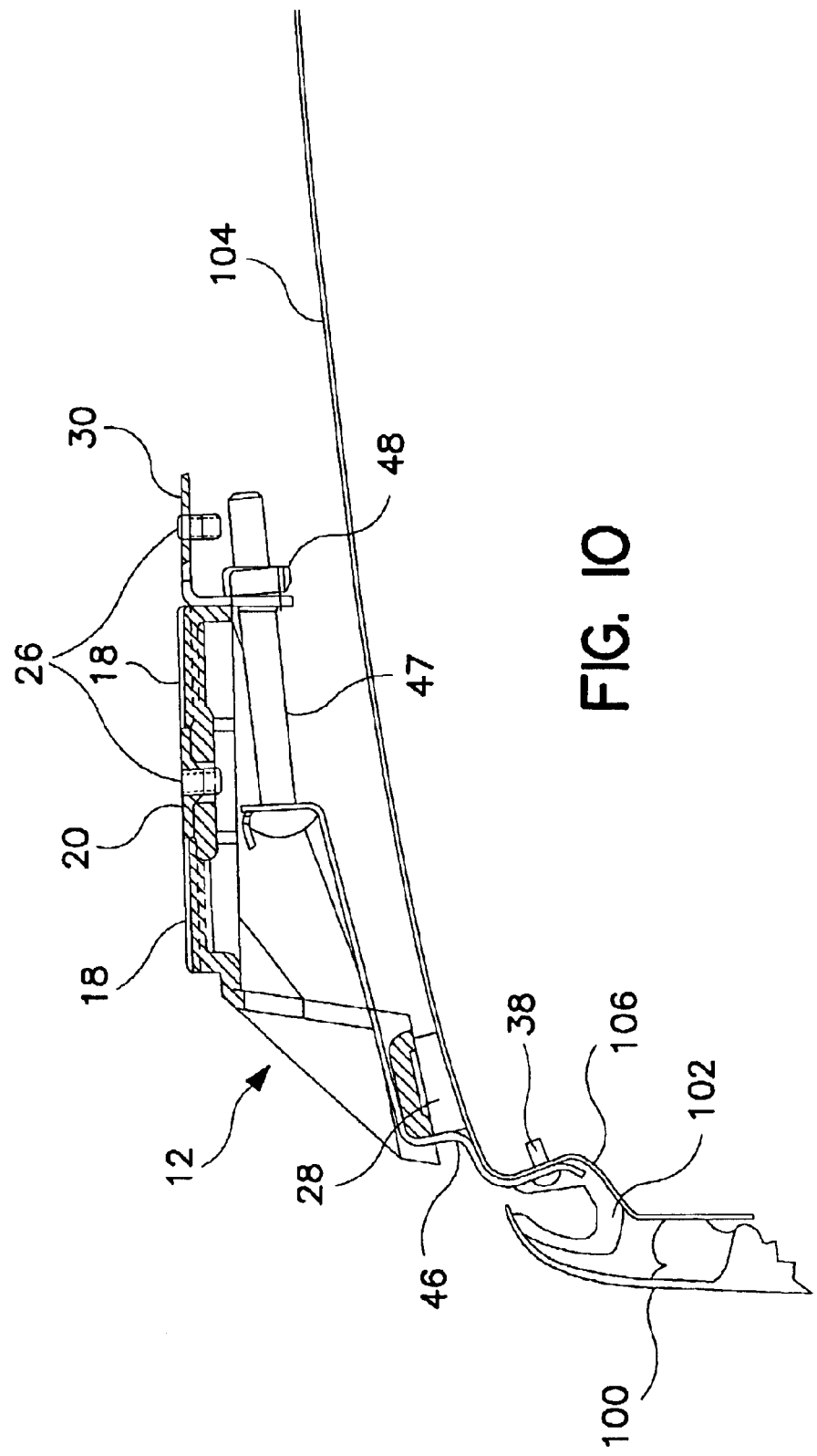
FIG. 10 is a sectional view through a representative installation environment and a mounting foot assembly according to aspects of the present invention.

FIG. 10 is a sectional view through a representative installation for the mounting foot assembly 10. One mounting foot assembly 10 is shown mounted to the roof 104 of a service vehicle. To the left of the Figure, the roof slopes toward the door 100. As previously discussed, the primary component 12 of the mounting foot assembly is configured to partially accommodate the slope of the roof. The base 13 of each primary component defines three recesses 29 (best seen in FIG. 7) which receive rubber pads 28 as shown in FIG. 10. A mounting strap 46 is secured to the blocking bar 30 by a machine screw 47 threadably engaged with the self-retained nut 48. The mounting strap 46 passes over a central portion of the base 13 of the primary component 12 and is secured to the door jamb 106 of the motor vehicle by a fastener 38.

Tightening the machine screw 47 draws the mounting strap 46 tight over the base 13 to compress the rubber feet 28 against the roof 104 of the vehicle. The rubber feet 28 conform to the slope of the roof 104 as shown in FIG. 10. FIG. 10 also illustrates that the blocking bar 30 abuts the inward end of the support platform 18. The lateral ends of both the retaining bar 20 and the blocking bar 30 are engaged in the mounting foot slots 21. The outward and downward force exerted by the mounting strap 46 retains the light bar securely to the roof 104.

FIG. 10 illustrates an installation that does not pierce the roof 104 of the vehicle. An alternative "permanent" installation uses fasteners passing through the openings in the base 13 and the rubber feet 28 to directly engage the roof 104.

It will be apparent that a secure mounted relationship between the lightbar and an emergency vehicle is of great importance. The mounting system must be robust to withstand the high g forces which emergency vehicle use may place on them. The invention addresses the hazards presented by release of a lightbar from a vehicle in several ways. First, the retaining bar 20 greatly enhances the strength of the engagement between the lightbar and the primary component 12. The primary component 12 is heavily reinforced with strengthening webs 15 in the fiber reinforced plastic material. The blocking bar 30 effectively blocks counter clockwise rotation of each primary component 12. Further, the mounting foot assemblies 10 are configured such that, when installed at either lateral end of a lightbar, rotation in opposite directions is required to disengage respective ends of the lightbar.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A removable mounting foot assembly for supporting an elongated member, the elongated member being comprised of a first material and having a pair of spaced parallel channels therein, each said channel comprising a slot defined between the elongated member and a longitudinally extending lip, said slots being in facing relationship, said mounting foot assembly comprising:

a primary component having a base for supporting the elongated member in spaced relationship to a mounting surface and a support platform with laterally extending tabs configured for reception into respective of said slots, said support platform having a lateral dimension W, a longitudinal dimension L, L1 and configured so that one diagonal dimension D does not exceed the lateral dimension W, wherein the primary component is engageable with the elongated member by orienting the support platform longitudinal dimension L, L1 substantially perpendicular to and between said longitudinally extending lips, inserting the support platform toward the elongated member to bring said tabs into alignment with said slots, and rotating said support platform such that the lateral dimension W is substantially perpendicular to said longitudinally extending lips and said tabs are engaged in respective of said slots.

2. The mounting foot assembly of claim 1, wherein said support platform defines a recessed channel extending laterally across the support platform and interrupting respective of said laterally projecting tabs and said mounting foot assembly comprises:

a retaining bar receivable in said channel with ends of the retaining bar forming an intermediate portion of said laterally projecting tabs at said interruption.

3. The mounting foot assembly of claim 1, comprising:

a retaining bar receivable in a channel defined by said support platform, said retaining bar configured to laterally traverse said support platform and form an intermediate portion of each laterally extending tab, said retaining bar defining a plurality of threaded bores; and a plurality of threaded fasteners engageable in said bores.

4. The mounting foot assembly of claim 1, wherein a first pair of diagonally opposite corners of said support platform are defined by portions of a circle having a diameter equal to diagonal dimension D.

5. The mounting foot assembly of claim 1, wherein a first pair of diagonally opposite corners of said support platform are defined by portions of a circle having a diameter equal to diagonal dimension D and one of a second pair of diagonally opposite corners of said support platform comprises a projection of said tab generally perpendicular to said dimension W.

6. The mounting foot assembly of claim 1, wherein a first pair of diagonally opposite corners of said support platform are defined by portions of a circle having a diameter equal to diagonal dimension D and one of a second pair of diagonally opposite corners of said support platform comprises a projection of said tab generally perpendicular to said dimension W, said mounting foot assembly comprising:

a blocking bar having lateral ends configured for reception into respective of said slots and defining a notch complementary to said projection.

7. In combination:

a lightbar comprising an elongated member having a pair of spaced parallel channels therein, each said channel comprising a slot defined between the elongated member and a longitudinally extending lip, said slots being in facing relationship on an exterior surface of said lightbar; and a mounting foot assembly comprising:

a primary component including a base for supporting the elongated member in spaced relationship to a mounting surface and a support platform with laterally extending tabs configured for reception into respective of said slots, said support platform having a lateral dimension W, a longitudinal dimension L, L1 and configured so that one diagonal dimension D does not exceed the lateral dimension W, wherein the primary component is engageable with the elongated member by orienting the support platform dimension L, L1 substantially perpendicular to and between said longitudinally extending lips, inserting the support platform toward the elongated member to bring said tabs into alignment with said slots, and rotating said support platform such that the lateral dimension W is substantially perpendicular to said longitudinally extending lips and said tabs are engaged in respective of said slots.

8. The combination of claim 7, wherein said support platform is generally rectangular and a first pair of diagonally opposite corners of said support platform are defined by portions of a circle having a diameter equal to diagonal dimension D.

9. The combination of claim 7, wherein said support platform defines a recessed channel extending laterally across the support platform and interrupting respective of said laterally projecting tabs and said mounting foot assembly comprises:

a retaining bar receivable in said channel with ends of the retaining bar forming an intermediate portion of said laterally projecting tabs at said interruption.

10. The combination of claim 7, comprising:

a retaining bar receivable in a channel defined by said support platform, said retaining bar configured to laterally traverse said support platform and form an intermediate portion of each laterally extending tab, said retaining bar defining a plurality of threaded bores; and a plurality of threaded fasteners engageable in said bores, wherein said fasteners extend through the bores to bear against said elongated member and force the ends of the retaining bar and said tabs against said lips to frictionally lock said mounting foot assembly to said elongated member.

11. The combination of claim 7, wherein a first pair of diagonally opposite corners of said support platform are defined by portions of a circle having a diameter equal to diagonal dimension D and one of a second pair of diagonally opposite corners of said support platform comprises a projection of said tab generally perpendicular to said dimension W, said mounting foot assembly comprising:

a blocking bar having lateral ends configured for reception into respective of said slots, said blocking bar defining a notch complementary to said projection and a plurality of threaded fastener openings;

a plurality of fasteners complementary to said fastener openings;

wherein the lateral ends of said blocking bar are engaged with said slots and the blocking bar is moved into a position where said projection fits into said notch, said fasteners are threaded through said fastener openings to bear against said elongated member to force said blocking bar away from said elongated member and frictionally lock the lateral ends of the blocking bar against said lips, whereby said blocking bar is fixed in a position that blocks said primary component from rotation relative to said elongated member.

* * * * *